(12) United States Patent
Spencer (10) Patent No.: US 12,451,975 B2
(45) Date of Patent: Oct. 21, 2025

(54) OPTO-ELECTRONIC ASSEMBLIES

(71) Applicant: Peter Spencer, Stafford (GB)

(72) Inventor: Peter Spencer, Stafford (GB)

( * ) Notice: Subject to any disclaimer, the term of this patent is extended or adjusted under 35 U.S.C. 154(b) by 512 days.

(21) Appl. No.: 17/910,575

(22) PCT Filed: Mar. 10, 2021

(86) PCT No.: PCT/GB2021/050595
§ 371 (c)(1),
(2) Date: Sep. 9, 2022

(87) PCT Pub. No.: WO2021/181094
PCT Pub. Date: Sep. 16, 2021

(65) Prior Publication Data
US 2023/0155420 A1    May 18, 2023

(30) Foreign Application Priority Data

Mar. 11, 2020  (GB) .................... 2003507

(51) Int. Cl.
*H04B 10/80* (2013.01)
*H02J 50/30* (2016.01)
*H02J 50/40* (2016.01)

(52) U.S. Cl.
CPC .......... *H04B 10/807* (2013.01); *H02J 50/30* (2016.02); *H02J 50/40* (2016.02)

(58) Field of Classification Search
CPC .... H04B 10/80; H04B 10/801; H04B 10/802; H04B 10/803; H04B 10/806; H04B 10/807; H02J 50/30; H02J 50/40; H02J 50/402; H02J 50/00
See application file for complete search history.

(56) References Cited

U.S. PATENT DOCUMENTS 4,752,693 A * 6/1988 Nagano ................ H03K 17/795
327/109
5,393,989 A * 2/1995 Gempe ................ H04B 10/807
250/551

(Continued)

FOREIGN PATENT DOCUMENTS

EP         0066180 A2    12/1982
WO    2010027459 A2     3/2010
WO    2018126161 A1     7/2018

OTHER PUBLICATIONS

Dietz et al., "Very Low-Cost Sensing and Communication using Bidirectional LEDs," Mitsubishi Electric Research Laboratories, Inc., http://merl.com/publications/docs/TR2003-35.pdf, Cambridge, Massachusetts (Jul. 2003).

(Continued)

*Primary Examiner* — Georgia Y Epps
(74) *Attorney, Agent, or Firm* — Kolitch Romano Dascenzo Gates LLC (57) ABSTRACT

An opto-electronic power transfer assembly comprises a first circuit comprising a primary LED (3), and a second circuit comprising a secondary LED (5), wherein the primary and secondary LEDs are optically coupled to each other so as to provide a bidirectional current transfer ratio therebetween of at least 32%. With such an assembly, light can be used in place of a magnetic field to make a photonic equivalent of an induction transformer.

24 Claims, 6 Drawing Sheets

(56) References Cited

U.S. PATENT DOCUMENTS

| | | | | |
|---|---|---|---|---|
| 5,436,553 A | * | 7/1995 | Pepper | H04B 10/807 |
| | | | | 323/902 |
| 5,753,928 A | | 5/1998 | Krause | |
| 5,834,763 A | * | 11/1998 | Edwards | H03B 17/00 |
| | | | | 327/515 |
| 2009/0179209 A1 | | 7/2009 | Xuan et al. | |
| 2011/0210236 A1 | | 9/2011 | Hertel | |
| 2017/0141872 A1 | * | 5/2017 | Kasai | H04B 10/69 |
| 2017/0222488 A1 | * | 8/2017 | Madawala | H02J 7/00712 |
| 2019/0221554 A1 | * | 7/2019 | King | H01L 25/165 |
| 2022/0368166 A1 | * | 11/2022 | Golan | H04B 10/807 |
| 2023/0155420 A1 | * | 5/2023 | Spencer | H02J 50/40 |
| | | | | 307/104 |
| 2024/0154523 A1 | * | 5/2024 | Williams | H02M 1/4241 |

OTHER PUBLICATIONS

Dumke, William P., "Spontaneous Radiative Recombination in Semiconductors," Physical Review Journals Archive, vol. 105, No. 1, pp. 139-144, American Physical Society (Jan. 1957).

Harris, Bill, "Determining Output Transformer Impedance," Bill's Antique Radios, https://radioremembered.org/outimp.htm (Feb. 27, 2019).

Lange et al., "LED as Transmitter and Receiver in POF-based Bidirectional Communication Systems," 2018 International IEEE Conference and Workshop in Obuda on Electrical and Power Engineering (Cando-EPE), IEEE, pp. 137-142 (Nov. 20-21, 2018).

List, Jenny, "Optical Communication Using LEDs Alone," Hackaday. com, https://hackaday.com/2019/12/22/optical-communication-using-leds alone/ (Dec. 22, 2019).

Roedel et al., "A Ga1-xAlxAs Monolithic Opto-Isolator," IEEE Electron Device Letters, vol. EDL-1, No. 2 (Feb. 1980).

Stern et al., "Photon Recycling in Semiconductor Lasers" Journal of Applied Physics, vol. 45, 3904-3906 (1974).

Wang et al., "Influence of Photon Recycling on Semiconductor Luminescence Refrigeration," Journal of Applied Physics, vol. 100, 043502 (2006).

Whitlock, Bill, "Audio Transformers, " Handbook for Sound Engineers, 3rd Edition, Ch. 11, pp. 1-29, Focal Press (2001).

"Coupling (Electronics)," Wikipedia, (Sep. 7, 2022, 12:26 PM), https://en.wikipedia.org/wiki/Coupling_(electronics)/.

"Laser Propulsion," Wikipedia, (Sep. 7, 2022, 12:27 PM), https://en.wikipedia.org/wiki/Laser_propulsion#Photon_recycling/.

"Opto-Isolator," Wikipedia, (Sep. 7, 2022, 12:26 PM), https://en.wikipedia.org/wiki/Opto-isolator#Bidirectional_opto-isolators/.

"Thermophotovoltaic," Wikipedia, (Sep. 7, 2022, 12:27 PM), https://en.wikipedia.org/wiki/Thermophotovoltaic#Background/.

Mims III, Forrest M., "Bidirectional Optoisolator Puts Two LEDs Nose to Nose," Designer's Casebook 4, p. 27, Electronics, McGraw-Hill, Inc., New York (May 10, 1979).

Mims III, Forrest M., "Experimenting with a Two-Way Optoisolator," Jameco Electronics, (Sep. 7, 2022, 12:24 PM), https://www.jameco.com/Jameco/workshop/diy/two-way-optoisolator-forrest-mims.html/.

Xiaoyun et al., "Photon Recycling Semiconductor Light-Emitting Diode," Light-Emitting Diodes: Research, Manufacturing, and Applications IV, vol. 3938, pp. 60 (Apr. 17, 2000).

Li et al., "High Performance Organic-Inorganic Perovskite-Optocoupler Based on Low-Voltage and Fast Response Perovskite Compound Photodetector," Scientific Reports, pp. 1-6, vol. 5, 7902 (Jan. 20, 2015).

Search Report issued in connection with United Kingdom Patent Application No. GB 2003507.7, United Kingdom Intellectual Property Office, Jul. 24, 2020.

* cited by examiner

OPTO-ELECTRONIC ASSEMBLIES

FIELD OF THE DISCLOSURE

The present disclosure relates to opto-electronic devices and more particularly to power transfer using opto-electronic devices.

Background to the Disclosure

In 1831 Faraday discovered the effect of magnetic induction, followed independently by Henry in 1832. It was observed that sudden changes in magnetic field induced voltages in coils of wire. After about 60 years it was understood that by efficiently coupling two coils using an iron ring, so that they shared the same magnetic field, a device called an induction transformer, nowadays just "transformer", could be is constructed.

If a "primary" coil of 10 turns of wire were made around an iron ring, and a "secondary" of 20 turns for example, then a changing voltage (Alternating Current, AC) on the primary would induce double this voltage on the secondary; meanwhile, the current drawn by the primary would be double that drawn by the secondary. Each turn around the iron "core" increases that coil's area in the same magnetic field, and therefore increases the magnetic flux seen by the coil. This device was and remains a crucial part of electrical power systems, by transforming high-voltage low-current power lines into low-voltage high-current usable mains power.

The coupling of the primary coil to the secondary coil is symmetric and bidirectional in most transformer designs, and this is important for efficient operation: The power drawn by the primary is determined by the electrical load on the secondary, i.e. when power demand reduces, the power input is also reduced. Without this feedback effect, a transformer would draw unnecessary power in practical use, reducing efficiency.

A useful side-effect comes about because the primary and secondary coils of the transformer are not directly connected to each other, allowing isolation between the power lines and the houses and appliances therein. This is an important safety feature that vastly reduces the electrocution hazard to people and the equipment.

Another method of isolation is the opto-isolator, where a light-emitter (typically a light-emitting diode, LED) is coupled with a light-absorber (typically a silicon photodiode or phototransistor). Power applied to the light-emitting diode produces light which generates a current in the photodiode or causes the phototransistor to conduct. This provides protection for sensitive electronics in harsh environments, such as a factory with lots of high-power machinery and interference.

A more modern option for "transforming" voltages is the switching power supply, or a DC-DC converter. These work by chopping up an input power signal into a high frequency (kHz~MHz) AC signal and then either transforming with an induction transformer or combining a single induction coil with a switch to create a higher, or lower, voltage. These devices can be highly efficient, even >90% is practical, but rely on creating changing magnetic fields, sometimes at high frequencies. These fields emit and are susceptible to electromagnetic radiation in the radio and microwave range. These cause problems for other equipment and are tightly regulated as "EMI" (ElectroMagnetic Interference).

To create a stable DC voltage after using a transformer or switching power supply the fluctuations must finally be removed from the output DC signal from the power supplies, which cannot be completely achieved without slowing down the response of the power supply system, or large and bulky diodes, capacitors and inductors. This problem is known as "ripple" and is fundamental to switching power supplies and DC-DC converters. This is a serious enough issue that switching power supplies cannot be used in some sensitive equipment, instead requiring bulkier and less efficient linear power supplies.

Magnetic induction transformers rely fundamentally on fluctuations in magnetic field, but opto-couplers operate in the steady-state (Direct Current, DC).

SUMMARY OF THE DISCLOSURE

The present disclosure provides an opto-electronic power transfer assembly comprising:
  a first circuit comprising a primary LED; and
  a second circuit comprising a secondary LED,
  wherein the primary and secondary LEDs are optically coupled to each other so as to provide a bidirectional current transfer ratio therebetween of at least 32%.

According to the present disclosure, substantive transfer of both current and voltage may be provided for efficient power transfer. In order to achieve this, a threshold Current Transfer Ratio (CTR, that is, the ratio of the current flowing in a first LED to the current this generates in a second LED optically coupled to the first LED) of 32% is required. Because of the logarithmic/exponential shape of the diode's I-V curve, it was found that the voltage falls off rapidly for further reductions in CTR.

This disclosure details how light can be used in place of a magnetic field to make a "photonic" equivalent of an induction transformer.

Light-emitting diodes (LEDs) both emit light when electrically stimulated and absorb light to produce electrical stimulation (the photovoltaic effect). Einstein showed that light emission and absorption are fundamentally symmetrical. However, this is often overlooked because we can make good quality light detectors from silicon, despite it being an extremely poor light emitter.

A "primary" LED can be used to illuminate a "secondary" photovoltaic detector to transfer a signal between two electrically isolated circuits. The inventor has realised that if the optical coupling is efficient enough then meaningful amounts of power can be transferred between two LEDs. LEDs that are optically coupled together with high efficiency behave in a fundamentally different way in electrical circuits, compared to individual LEDs.

The current versus voltage characteristic of a diode is highly nonlinear and therefore it is not obvious or expected that the primary and secondary light-emitting diodes would show a meaningful or simple relationship to each other. This has discouraged investigation into opto-couplers for power transmission.

A high-efficiency light emitter will also be an efficient light absorber. An ideal and lossless light-emitting diode will emit one photon for every electron that travels from its cathode to its anode. Conversely, when a photon is absorbed then an electron is freed to either recombine inside the light-emitting diode, or flow around the connected circuit (the "photovoltaic" effect, used in solar cells).

If a primary light-emitting diode is driven by a power source it will emit light, which if efficiently coupled to a secondary light-emitting diode, will be absorbed and the power conveyed to a circuit attached to the secondary light-emitting diode.

The voltage across the light-emitting "junction" of the LED is determined by the is density of electrons and "holes" in the junction: the voltage is the "fill-level" indicator for these charge carrying particles, which will be referred to as "carriers" hereafter. In an efficient LED, the carrier density is increased by providing electrical current from a connected circuit or by absorbing light, while it is decreased by the electrons and holes "recombining" to emit light. These processes increase exponentially with junction voltage.

With high-efficiency optical coupling and identical LEDs, the light emission and absorption processes will have equal weight in determining the junction voltages of the LEDs. If a photon is emitted by one LED and absorbed by the other, it could likely be re-emitted by the other LED and re-absorbed by the first, and over and over: this is known as photon recycling. The recycling effect will mean that there is a higher photon density than without the coupling and the two LEDs' voltages will rise to reach an equilibrium with each other. This means that there is no one-way transmission of power, there is concurrent bidirectional transfer of energy in LEDs that have high efficiency optical coupling.

The increased voltage due to photon recycling de-couples the current and the voltage's dependence on each other and is a voltage-mode regulation effect: the primary and secondary voltages can be equal independently of the current. This is not expected for individual LEDs, or under low efficiency optical coupling.

In a high efficiency coupled LED system, the current vs. voltage characteristics of the secondary LED's circuit will be conferred to the primary LED's circuit, just like a magnetic induction transformer would do.

If two LEDs are efficiently coupled via a light field, it is a three-way system and the role of the light field needs to be included. The light field can be approximated as having a density of photons, all with an energy set by their wavelength, or colour. In contrast to the LEDs, where the energy of the carriers changes with their density (the voltage), the light field has an infinite capacity for photons.

The total system will be attempting to reach equilibrium and thus when the junction is voltage (times the electron charge) is equal to the photon energy, the behaviour of the system will change drastically: If the losses are low, the system will start to act as a laser and the light field fixes or "clamps" the junction voltage; any additional current through the LED is efficiently converted to light because of the infinite capacity of the light field. This clamping of the junction voltage is equivalent to the saturation of an induction transformer when the internal magnetic field fully magnetizes the core.

If the LEDs are below the saturation voltage, then the photon recycling effect increases their voltages towards the saturation voltage, and this gives voltage-mode regulation according to examples of this disclosure. If the primary LED is above the saturation voltage but there is no lasing, then the photon recycling effect acts to reduce the primary's voltage while increasing the photon density because of stimulated emission; this results in a current-mode regulation effect.

The following table summarises the different behaviour due to the photon's nature. $V_{primary}$ is the junction voltage across the primary LED, $E_{photon}$ is the energy of the photons at the dominant wavelength of the LED, and e is the charge of an electron.

| Voltage | Mechanism | Functionality |
|---|---|---|
| $V_{primary} < E_{photon}/e$ | Spontaneous emission | Voltage-mode regulation |
| $V_{primary} \geq E_{photon}/e$ | Stimulated emission | Current-mode regulation |

LEDs at room-temperature will happily emit light even when the applied voltage is substantially less than the photon energy because voltage is based on the "Helmholtz Free Energy", which is the usable energy that can be extracted. This is $E_{photon}$ minus a contribution from the temperature multiplied by an entropy term. There is no thermodynamic violation, it is an endothermic reaction that is made possible by using up some of the thermal vibrations in the semiconductor material. The thermal energy makes some of the electrons and holes boil-off and behave as an ideal gas, which also results in the exponential current vs. voltage characteristic of the diode.

In fact, when efficiently optically coupled, a portion of the light absorbed by the secondary light-emitting diode will be re-emitted (if the external circuit does not draw too much power from it) and consequently this portion can be re-absorbed by the primary light-emitting diode, providing photon recycling.

If the recycled photons' energy (i.e. their colour) is greater than the voltage across the light-emitting diode (when multiplied by the electron's charge) then they will increase the voltage when absorbed; if the recycled photons have a lower energy, then more photons are emitted (stimulated emission) and the voltage is reduced.

If the primary and secondary light-emitting diodes are highly-efficiently coupled, then multiple such emission and re-absorption cycles will occur until an equilibrium is established between the two diodes i.e. their voltages will equalise and both light-emitting diodes now share the same photon flux, just like the magnetic flux is shared between coils in an induction transformer.

If enough excess power is drawn from the secondary light-emitting diode to deplete its electron and hole population, then its re-emission will drop, and both its voltage and the primary's voltage will reduce in sympathy until a new dynamic equilibrium is achieved. Changes in the secondary circuit's voltage and current are conferred back to the primary circuit, again like an induction transformer.

The energy of the photons determines the maximum voltage across the primary and secondary light-emitting diodes for the voltage regulation effect. If the junction voltage (times the electron's charge) approximately exceeds the photon energy, and the diodes are efficiently optically coupled then lasing can occur, which will "clamp" the junction voltage. This represents the saturation point, analogous to an induction transformer that reaches its maximum internal magnetic field. This is done on purpose in devices that are called constant-voltage transformers, which are useful in protecting and regulating power systems.

If only the primary light-emitting diode's junction voltage (times the electron's charge) exceeds the photon energy, and lasing does not occur, then a current-mode is regulation effect occurs. When the primary junction voltage exceeds the photon energy, a process called stimulated emission will become dominant. Light re-emitted from the secondary will stimulate increased light output from the primary: if the load resistance on the secondary increases, the load current drops, raising the secondary's voltage and increasing re-emission. The primary will then be induced to transfer more photons to the secondary via stimulated emission, with the net result that the secondary's voltage will further increase to attempt to keep the secondary load current equal.

According to examples of the present disclosure, a current and voltage regulation effect occurs when the devices share a common photon flux.

If matched primary and secondary light-emitting diodes are matched and have equal area, then their current densities become equal when efficiently coupled. As discussed above their voltage will also be equalised. They will function effectively as a 1:1 ratio isolation transformer.

This disclosure describes the implementation of a photonic equivalent of the magnetic induction transformer. If two LEDs are optically coupled with high efficiency, their current vs. voltage properties alter, allowing changes in voltage and current to be conferred in both directions, just as an induction transformer ceases to appear like a pure inductor, called the load reflection or impedance reflection effect. By combining LEDs in parallel and series circuits, various transformation ratios can be achieved. The maximum voltage per LED is determined by the photon energy, which causes saturation of the photonic transformer.

Examples described herein can be used as an inductor free replacement for an induction transformer and can in principle be made into devices that mimic the different kinds of induction transformer available today. Thus, efficient optical networks may behave more like traditional wired circuitry.

In contrast to an induction transformer, this photonic coupling effect does not require a changing voltage (AC) to work, it is a steady-state (DC) effect.

Applications for isolation are currently limited by the requirement for an AC signal, or a separate power supply, and this disclosure may simultaneously solve these issues.

DC-DC conversion may now be achieved fundamentally without generating ripple voltage in the DC output, allowing use in sensitive circuit designs and reducing component count.

A device driven by AC (e.g. mains if isolation level can be achieved) could automatically "rectify" the AC input to a DC output, without external rectifying diodes (reducing the component count), although an external capacitor may still be needed to smooth the output. An almost "single-chip" linear power supply may be obtained.

It could also potentially be used in longer distance (cm to a few metres) systems over optical fibres for electronics that needs to be isolated, e.g. medical devices, computer peripherals such as an automotive diagnostic tool.

A more blue-sky type application area is that of optical networks and circuits on microchip/printed-circuit board scales. This disclosure shows that highly-efficient optical links may behave much more like conventional wires than has heretofore been anticipated. This may make them more efficient due to the photon recycling effect.

Scope of application:
Electronic circuits
Power supplies
Sensitive instrumentation and measurement
Optical communication
Optical integrated circuitry
Works for DC voltages as well as AC voltages
Signal processing (e.g. audio/public address systems)
Electrical isolation
Potential uses:
Isolation of power or communication lines (1:1 isolation transformer)
Reducing or increasing voltage or current (power supply transformer) of either DC or AC power
Producing negative power rail from positive power rail with zero switching noise.
Rectification of AC power or signals
An inductor-less bias tee type device for high-frequency circuits
Integration with a controller and switch network to create a programmable/adaptive transformer with variable primary:secondary ratio.
On-chip optical networks and optical circuits (i.e. optical links equivalent to electrical wires)

Examples according to the present disclosure may not generate a fluctuating magnetic field (ElectroMagnetic Interference, EMI)
No inductive "back EMF" voltage spikes (normally generated by coils)
Can be shielded fully with a thin metal or black paint/plastic coating, instead of bulky heavy magnetic shielding using martensitic steel or MuMetal alloy.
Lower interference with other electronics for sensitive circuits (EMI)
Easier compliance with EMI regulations
No "hum" noise/vibration during operation (due to magnetostriction).

Inductive components work by generating a magnetic field which they use to store energy. This field changes as the components are used, and this causes electromagnetic waves to spread from the device (i.e. radio waves/microwaves) and this is fundamental. These waves interfere with the operation of other electrical devices and are periodically implicated in health scares (e.g. mobile phone radiation). There are legal limits on the amount of EMI a product can emit and be exposed to before malfunction and therefore, limitation of EMI is a big issue in electronics design.

Examples described herein rely only on an optical field which can be blocked by paint, dyed plastic, or metal coatings or casings. Its EMI performance may be equivalent to a typical transistor.

Examples of the present disclosure may be susceptible to miniaturisation to microchip:
Smaller devices can be made to reduce losses and optimise efficiency (very low power supplies can be inefficient)
Microchip-sized transformers only possible at ≥MHz with induction
Proven scalability of manufacturing production techniques
Could be integrated with other circuit elements for single-chip solution
Could be integrated with switches to allow variable transformer ratio The individual microchips will work well at sizes from a few square micrometres up to a few square millimetres. Existing solutions (inductive transformers) of this small size work only at MHz+ frequencies.

No new technology is required to package these microchips, they integrate directly with existing solutions and electronics.

Examples of assemblies according to the present disclosure may be lower in weight compared to iron/ferrite/copper transformers, making them more portable, and exerting less mechanical strain on a supporting circuit board or mounting point.

The technology described herein may be readily scalable. Devices according to examples of the present disclosure may be connected in parallel to increase current handling, and in series to handle higher voltages; the practical limits come in handling the heat generated by the devices and avoiding high voltages arcing across components.

Assemblies according to examples of the present disclosure preferably include efficient coupling of their emitted light to each other, such that the primary and secondary LEDs share the same photon flux.

This disclosure describes high efficiency optical coupling which is fundamentally bi-directional to the point that it behaves like an induction transformer. Current public domain optical coupling is in one direction only per channel at any given time.

Existing opto-couplers enact low efficiency uni-directional transmission of information; this disclosure enacts concurrent bi-directional transmission of power inherent to a high efficiency optical channel. This allows the construction of an "optical transformer".

The combination of power transfer and high efficiency means that both current and voltage are regulated across the coupling device, analogous to the principle of a magnetic induction transformer.

By comparison, "bi-directional" opto-couplers in the current public domain are operated in a so-called "half-duplex" mode where transmission is always uni-directional at any given moment, with the direction being switched to allow two-way communication (also known as "time multiplexing"). This requires substantial additional component cost and complexity.

Symmetrical light emission and absorption is a preferred feature of this disclosure. A practical design could though have asymmetry built-in to optimise a specific use case, specifically if it is done to boost the symmetry of the optical coupling feedback effect in practice. An example of this in the following use case is that the upper light-emitting diode might have a lower (higher) defect density and thus lower (higher) losses which might make it work better as the secondary (primary, if higher defects).

Such a difference might arise due to the choice of manufacturing technique.

High-efficiency optical coupling between the primary, secondary, etc. emitter/absorbers preferably involves:
   Good matching of absorption and emission spectra/wavelengths
   Good matching of current density versus voltage characteristics
   Low losses due to light escaping the system
   Low losses due to unintentional/unwanted absorption The optical feedback from photon recycling between the two LEDs may act to reduce the bias current needed for a given voltage. It has been possible to achieve a 10% reduction in the bias current by this method (10% less current needed if the secondary LED is open-circuit, compared to short-circuited). This was achieved with just over 15% CTR (no amplification). This behaviour is known as "load reflection" (also "impedance reflection") in inductive transformers because the current drawn by the primary "reflects" the current drawn from the secondary.

In some preferred implementations, the primary and secondary LEDs are optically coupled to each other so as to exhibit a load current reflection therebetween of at least 10%.

In further examples according to the present disclosure, the primary and secondary LEDs may be optically coupled to each other so as to provide a bidirectional current transfer ratio therebetween of at least 50%.

Preferably, the primary and secondary LEDs are optically coupled to each other so as to exhibit a load current reflection therebetween of at least 25%.

The first and second circuits may be electrically separate from each other in some examples according to the present disclosure.

The secondary LED may be configured to achieve a population inversion at a lower current or current density than the primary LED. For example, the secondary LED may be configured to achieve this by having, in comparison with the primary LED, one or more of: a smaller device volume, a smaller volume of light-emitting material, fewer diode junctions, fewer thin-film layers, thinner thin-film layers, and a different semiconductor composition.

In a preferred example of the present disclosure, a primary reverse LED is electrically coupled in parallel with the primary LED, with the forward conduction direction of the primary reverse LED opposite to that of the primary LED,
   a secondary reverse LED is electrically coupled in parallel with the secondary LED, with the forward conduction direction of the secondary reverse LED opposite to that of the secondary LED, and
   the primary reverse LED and the secondary reverse LED are optically coupled to each other so as to provide a bidirectional current transfer ratio therebetween of at least 32%.

In a further preferred implementation, a primary reverse LED is electrically coupled in parallel with the primary LED, with the forward conduction direction of the primary reverse LED opposite to that of the primary LED,
   a first reverse protection diode is electrically coupled in series with the secondary LED, with the forward conduction direction of the first reverse protection diode opposite to that of the secondary LED,
   a secondary parallel LED is electrically coupled in series with a second reverse protection diode, with the forward conduction direction of the second reverse protection diode opposite to that of the secondary parallel LED, and the forward conduction direction of the secondary parallel LED in the same direction as that of the secondary LED, and
   the primary reverse LED and the secondary parallel LED are optically coupled to each other so as to provide a bidirectional current transfer ratio therebetween of at least 32%.

In another preferred example, a first primary reverse protection diode is electrically coupled in series with the primary LED, with the forward conduction direction of the first reverse protection diode in the same direction as that as of the secondary LED,
   a second primary LED is electrically coupled in series with a second primary reverse protection diode, with the forward conduction direction of the second primary LED in the same direction as that as of the second primary reverse protection diode,
   the primary LED and the first primary reverse protection diode are electrically coupled in parallel with the second primary LED and the second primary reverse protection diode, with the forward conduction direction of the second primary LED in the opposite direction to that of the primary LED, and
   is the primary LED and the second primary LED are each optically coupled to the secondary LED so as to provide a respective bidirectional current transfer ratio between (a) the primary LED and the secondary LED, and (b) the second primary LED and the secondary LED, of at least 32%.

In another preferred implementation, an opto-electronic transformer comprises an opto-electronic power transfer assembly as described herein, wherein:

the first circuit has a primary set of LEDs which comprises the primary LED and at least one further primary LED, the second circuit has secondary set of LEDs which comprises the secondary LED and at least one further secondary LED, each LED of the first set is optically coupled to a respective LED of the second set so as to provide a bidirectional current transfer ratio therebetween of at least 32%, and the LEDs of the primary set are electrically coupled in parallel and the LEDs of the second set are electrically coupled in series.

If a collection of matched LEDs is coupled efficiently, then an LED transformer may be constructed by combining the collection in parallel and series circuits in this manner.

A further assembly according to the present disclosure may include a third circuit comprising a biasing LED for connection to a DC bias input power supply, wherein the third circuit is electrically separate from the first and second circuits, wherein the biasing LED is optically coupled to each of the primary and secondary LEDs so as to provide a respective unidirectional current transfer ratio between the biasing LED and each of the primary and secondary LEDs of at least 32%.

Preferably, the biasing LED is operable to emit a shorter wavelength of light than the primary and secondary LEDs. In this way, one-way current transfer may be provided from the biasing LED to the primary LED and from the biasing LED to the secondary is LED.

Another example of an assembly according to the present disclosure preferably includes:

a second secondary LED which is electrically coupled in series with the secondary LED, with the forward conduction direction of the second secondary LED in the same direction as that as of the secondary LED, wherein the primary LED is optically coupled to each of the secondary LED and the second secondary LED so as to provide a respective bidirectional current transfer ratio between the primary LED and each of the secondary LED and the second secondary LED of at least 32%.

A DC-DC converter according to the present disclosure may exhibit substantially no "ripple" voltage of the type associated with current public domain switching DC-DC converters.

Another example of an assembly according to the present disclosure preferably includes a primary LED that is electrically coupled to the secondary LED, where the orientations of the primary and secondary LEDs are either the same (anode of one LED coupled to the cathode of the other) or opposite (i.e. anodes coupled, or alternatively cathodes coupled).

With the provision of an electrical coupling between the primary and secondary LEDs, the voltage at the other terminal of the secondary LED may be well-defined relative to the voltage at the other terminal of the primary LED, in contrast to a "floating" output voltage when the primary and secondary LEDs are electrically separate.

This circuit can be used to output a negative voltage from a positive input voltage, or to generate a higher voltage output from a low voltage input supply (either positive or negative).

A common connection between primary and secondary LEDs may also reduce the is cost and complexity of manufacture of the assembly.

In preferred implementations, the primary and secondary LEDs are provided on a common semiconductor substrate.

Making matched diodes is possible by fabricating them on the same microchip die.

The major barrier to good LED efficiency is the low transmission coefficient from the LED interior to the outside world because of the huge refractive index mismatch between a semiconductor with between 2-4, and air at 1; if an LED pair is fabricated on the same die they may avoid any refractive index mismatch altogether, and the internal optical efficiency of semiconductor devices may readily exceed 90%. Other options may include use of high refractive index thin films such as diamond for example to intercede between two discrete LEDs, to obtain a higher electrical isolation barrier.

The primary and secondary LEDs may be provided in a common stack of layers of material on the semiconductor substrate. A light reflective coating may be provided on at least one side surface of the stack. Upper layers of a stack are divided by trenches to form a plurality of LEDs. The trenches may be filled with an insulating material.

If for example a secondary light-emitting diode was divided into four equal area devices, each one quarter the area of the primary, then their voltages would be equal to the primary but their short-circuit current densities are still equal; this means that one primary with voltage U and current I would be linked to four secondaries with voltage U and current I/4. Connecting the secondaries in series would result in a secondary circuit with voltage 4U and current I/4. This is equivalent to an induction transformer with 1:4 turns ratio.

In some examples of the present disclosure, an additional LED may be provided above the primary and secondary LEDs in the common stack of layers.

An assembly according to preferred examples may include an optical coupling between discrete primary and secondary LEDs, wherein the optical coupling comprises at least one of glycerol, silicone epoxy, PMMA (acrylic), sapphire, silicon crystal, silicon carbide, silicon nitride, titanium dioxide, magnesium oxide, tantalum oxide, hafnium dioxide, hafnium nitride, zirconia, zirconium nitride, zinc oxide, zinc selenide, quartz, diamond and glass.

In a further preferred example of the present disclosure, (at least) two optically coupled LEDs may be configured to emit and absorb more s-polarised light than p-polarised light or vice versa. This polarisation may enhance the coupling between the two LEDs, and may improve containment and guidance of light. The two LEDs may be configured to enhance the emission and absorption of s-polarised (TE-polarised) light and/or suppress the emission and absorption of p-polarised (TM-polarised) light. Alternatively, the two LEDs may be configured to enhance the emission and absorption of p-polarised (TM-polarised) light and/or suppress the emission and absorption of s-polarised (TE-polarised) light.

The polarisation may be desirable when using dielectric mirrors because their reflectivity can drop to zero or near-zero due to Brewster's effect, where the p-polarised can enter or exit a high refractive index medium without reflection at Brewster's angle.

This polarisation may be achieved by modifying the light emitting and absorbing material of an LED by strain, stress, self-assembly, chirality, magnetic or electric fields or by patterning the material by lithography, for example.

The polarisation of light emitted and absorbed by a medium can be modified by introducing strain, or by modulating the structure using lithography or self-assembly. An example is the use of strained thin films of semiconductor, for example an indium gallium arsenide alloy layer within a crystal of gallium arsenide, where the emission and absorption of light can be strongly s-polarised (TE polarised). Engineering the polarisation can be used to optimise coupling within, between, or outside of the LED assemblies.

A preferred implementation introduces strain to the LED emitting/absorbing material, or shapes the LED emitting/absorbing material on the scale of the wavelength of light by lithography or self-assembly, thereby modifying the polarisation of emitted and absorbed light.

For example, the material that is absorbing and emitting light in one or more of the LEDs may be under a strain of greater than or equal to plus or minus 0.25% when compared to its natural, or fully relaxed, state.

In a further example, the material that is absorbing and emitting light in one or more of the LEDs may be modified by lithography or self-assembly in a way that enhances or suppresses the LED's emission or absorption of p-polarised (or s-polarised) light relative to the s-polarised (or p-polarised) light by plus or minus 25%.

In another implementation, an external magnetic field may be applied to an assembly as described herein in a way that enhances or suppresses one or more of the LED's emission or absorption of p-polarised (or s-polarised) light relative to the s-polarised (or p-polarised) light by plus or minus 25%.

An assembly according to the present disclosure may include a dielectric mirror having a periodically-modulated refractive index profile that, at normal incidence relative to the axis of modulation, is able to reflect light of a frequency between the frequency of the light emission of the primary and secondary LEDs and a frequency of twice the frequency of the light emission of the primary and secondary LEDs.

A Distributed Bragg Reflector (DBR) is a dielectric mirror that comprises a periodic modulation of the refractive index of the mirror material. In a "uniform" DBR, each period of the refractive index modulation is identical. There are other non-uniform variants such as the "chirped" DBR where each period is monotonically thicker or thinner than its adjacent periods, and the "disordered" DBR where the thickness of each period is varied in a more complex pattern that is not necessarily monotonic.

Some implementations may include either a non-uniform, or a combination of non-uniform and uniform DBRs, to enhance either light trapping or light coupling between the LEDs.

It is desirable to control the reflections of light at higher angles of incidence within the LED material to couple the light between the LEDs, and to avoid unwanted absorption or leakage of the light within or out of the assembly.

A chirped or disordered DBR may be effective in this role because the phase velocity mismatch between layers in the direction of the DBR's modulation may be enhanced and/or suppressed at higher angles of incidence, depending on the polarisation of light.

A DBR should preferably contain many periods to effectively reflect normally incident light, which comprises only a small percentage of the light that must be coupled to both LEDs for high efficiency.

A DBR that is designed to reflect light at higher angles of incidence within the LED material will be more effective for a given number of periods.

A preferred implementation may include a uniform, chirped, or disordered DBR, or combination thereof, that effectively redirects light at high angles of incidence that the escape cone of the LED material of the primary and secondary LEDs.

In a further example of an assembly as described herein, a multi-layer dielectric mirror may be included whose resonant wavelength at normal incidence extends to wavelengths in excess of 1000 nm longer than the resonant wavelength of the emitting and absorbing material in the primary and/or secondary LEDs.

The present disclosure also provides a method of transferring power from a first circuit to a second circuit, wherein the first circuit comprises a primary LED, the second circuit comprises a secondary LED, and the primary and secondary LEDs are optically coupled to each other so as to provide a bidirectional current transfer ratio therebetween of at least 32%, the method comprising the steps of:
passing a current through the primary LED via the first circuit; and
drawing a current in the second circuit via the secondary LED.

Preferably, the primary and secondary LEDs are optically coupled to each other so as to exhibit a load current reflection therebetween of at least 10%.

BRIEF DESCRIPTION OF THE DRAWINGS

Examples of the present disclosure will now be described by way of example and with reference to the accompanying schematic drawings, wherein.

DETAILED DESCRIPTION OF THE DRAWINGS

Figure 1:
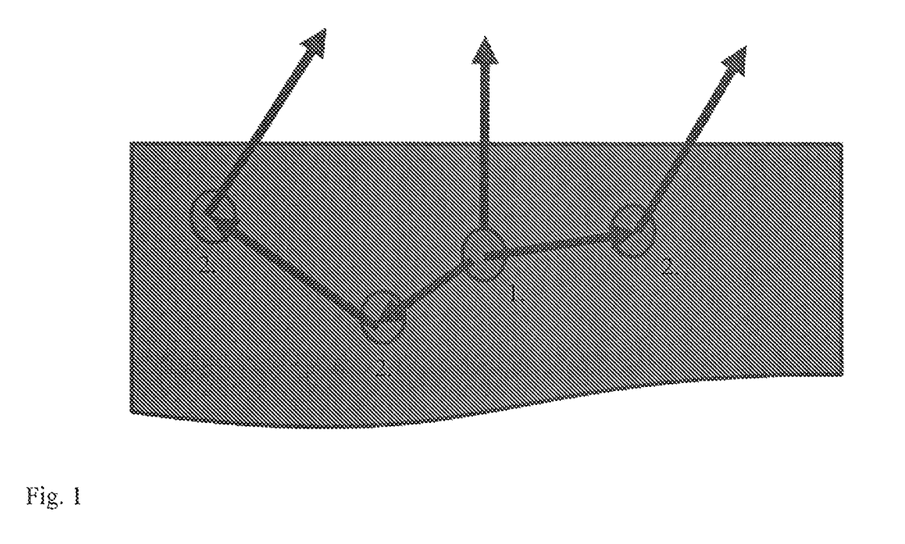
FIG. 1 is a diagram showing photon recycling within a device.

Photon recycling is known to occur within a single device, as shown in FIG. 1. It involves multiple internal re-absorption and re-emission (2) of emitted light (1).

Figure 2:
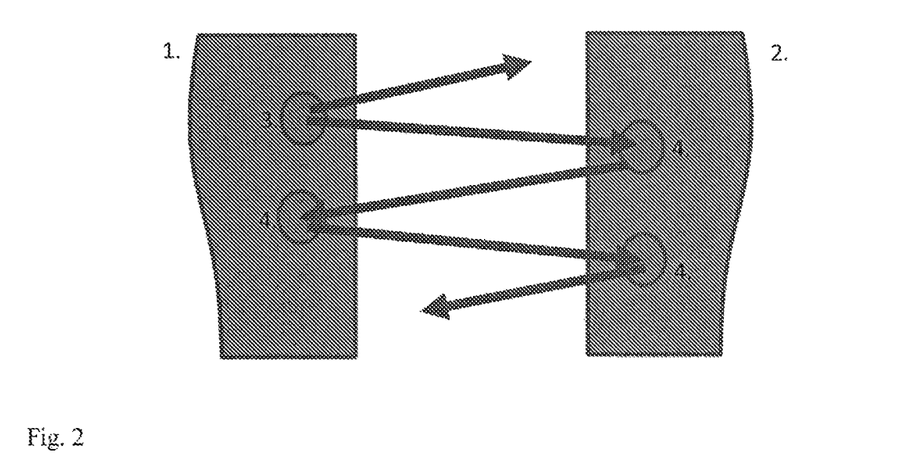
FIG. 2 is a diagram showing photon recycling between two separate devices.

This disclosure describes that photon recycling (4) of emitted light (3) can also occur between different devices (1) and (2) as illustrated in FIG. 2, i.e. external photon recycling, if (1) and (2) are efficiently optically coupled.

Figure 3:
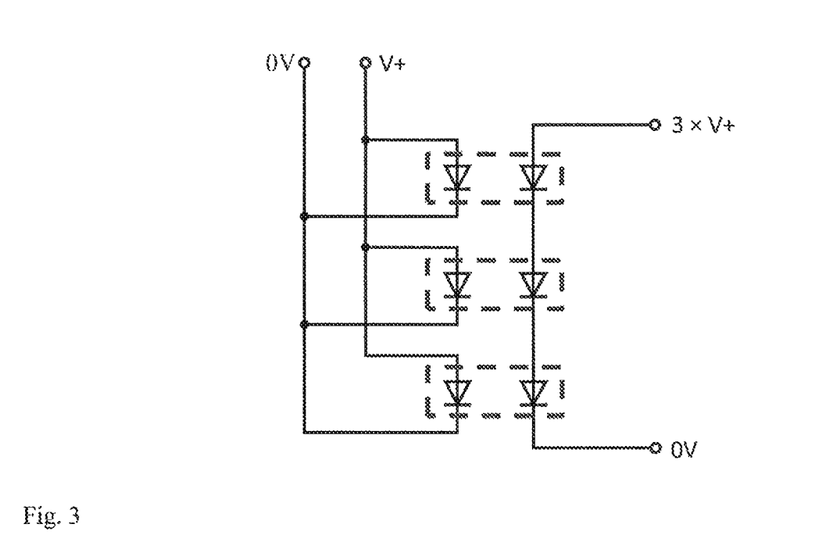
FIG. 3 is a circuit diagram showing an LED transformer according to an example of the present disclosure.

FIG. 3 shows six LEDs with three in parallel to form a "primary" and three in series to form a "secondary". In an LED transformer with six LEDs, the primary side consists of three LEDs in parallel in a first circuit while the secondary is wired in series in a second circuit, giving a transformer ratio of 1:3. Current public domain opto-couplers exhibit very low coupling efficiency, but with high efficiency coupling, photon recycling makes this assembly behave like an induction transformer.

If the optical coupling was perfect and the LEDs were identical and converted all current into usable light then the circuit shown in FIG. 3 would work as a 1:3 transformer: A primary voltage V and current I would be transformed to a secondary voltage of 3V and current I/3. It is a symmetric circuit and would work to transfer both from primary-to-secondary and secondary-to-primary.

Figure 4:
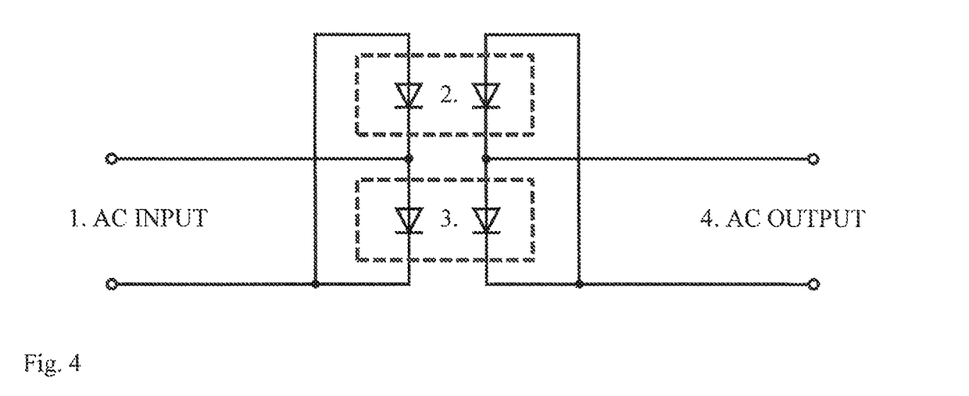
FIG. 4 is a circuit diagram of an AC LED transformer according to an example of the present disclosure.

As AC signals contain both positive and negative voltages, two photonic transformers wired in a "back-to-back" configuration as shown in FIG. 4 will work for AC and DC signals of either polarity. The light-emitting diodes will require protection diodes (Schottky for low voltage drop) if they are not able to handle reverse-bias voltages.

An AC version of the transformer (shown as 1:1 ratio) is shown in FIG. 4, using two DC versions wired "back-to-back". The AC input (1) is connected to a positive-side DC transformer (3) and a negative-side DC transformer (2), which are both connected to the AC output (4).

Figure 5:
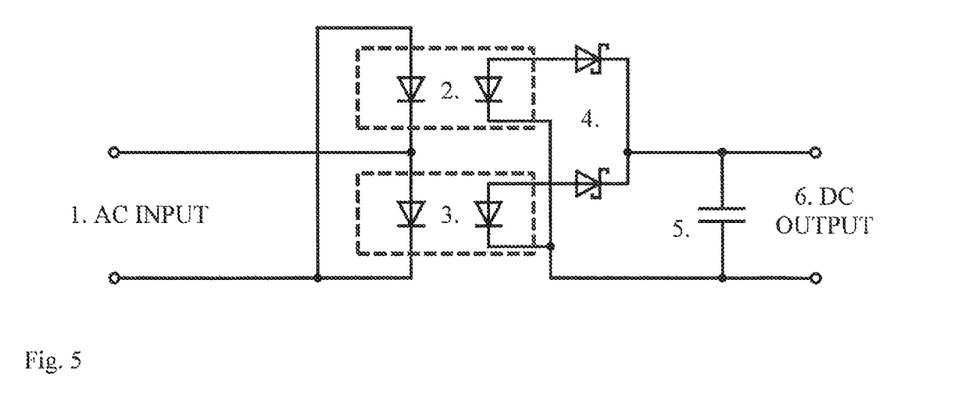
FIG. 5 is a circuit diagram of an AC-DC converter according to an example of the present disclosure.

If the circuit from FIG. 4 is modified by connecting the secondaries in parallel, then the transformer also rectifies an AC (or DC) signal into DC, as shown in FIG. 5.

This circuit requires reverse-voltage protection diodes (4) between the two secondaries to avoid forward biasing the negative (positive) transformer during the positive (negative) half-cycle of the AC input (1).

With a switching matrix to control the transformer ratio, this could form the basis of a universal power supply because it could accept a wide range of AC and DC input voltages.

A rectifying AC-to-DC version of the transformer is illustrated in FIG. 5, using two DC versions wired "back-to-back" on the primary-side and in parallel on the secondary-side. The AC input (1) is connected to a positive-side DC transformer (3) and a negative-side DC transformer (2). The secondaries are connected via reverse-voltage protection diodes (4) and DC output (6) through a smoothing capacitor (4).

Figure 6:
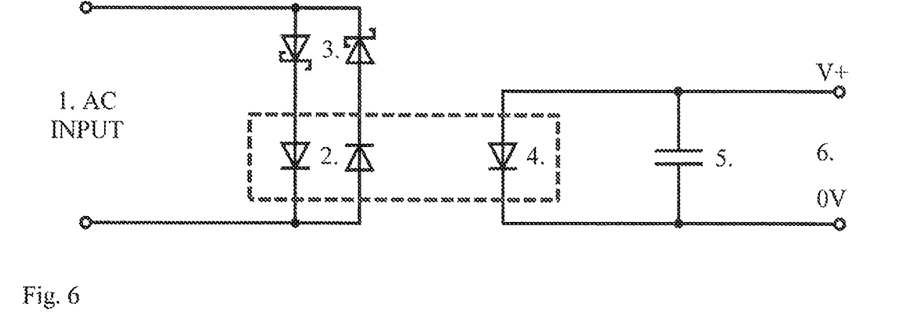
FIG. 6 is a circuit diagram of another AC-DC converter according to an example of present disclosure.

Another variation might be to have two primaries, connected in parallel but with one side reversed as shown in FIG. 6. This would allow an AC input signal (1) to be transformed and rectified into a DC signal (6). AC input (1) connects to the two parallel primary LEDs (2) through reverse-voltage protection diodes (3). The secondary LED (4) outputs the rectified DC into a smoothing capacitor (5) to produce DC output (6). It would require external reverse-voltage protection diodes (3) to isolate the reversed primary diode during the half-cycle when it is reverse biased and a smoothing capacitor (5). A single chip implementation may be envisaged that could generate a DC ±5 Volt supply from 240 Volts AC mains without bulky inductors if the required amount of isolation safety protection is obtainable.

Figure 7:
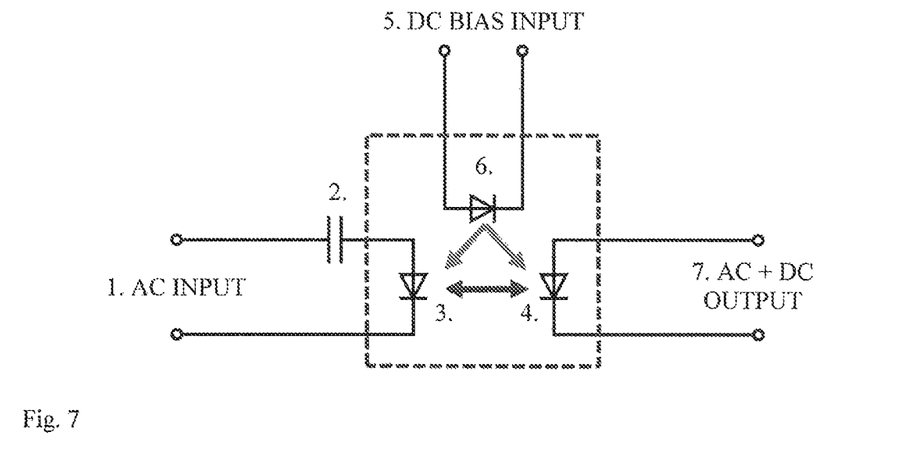
FIG. 7 is a circuit diagram of a photonic bias tee according to an example of the present disclosure.

External biasing could be added as shown in FIG. 7 using an additional but purposely mis-matched light-emitting diode (6). The purpose of this additional light-emitting diode is to supply power to overcome the internal losses of the matched light-emitting diodes (3) and (4), and even to provide power to components in a signal path (a device that does this is called a bias tee).

An AC signal (1) passes through a DC blocking capacitor (2) and into the primary LED (3), which is 1:1 coupled to the secondary LED (4). The DC bias (5) is introduced though a tertiary LED (6) that emits at a shorter wavelength than (3) or (4), such that (3) and (4) can absorb (6)'s emission but (6) cannot absorb the emission of (3) and (4). The DC+AC signal is therefore sent to the output (7) and no AC signal is coupled to (5).

A back-coupling effect from (3) and (4) to (6) is undesirable and can be suppressed by the biasing light-emitting diode (6) emitting photons of a higher energy (blue-shifting) because the lower energy photons from (3) and (4) will not be absorbed by (6). A DC blocking capacitor (2) is shown to avoid sending power back to the AC input (1), while the AC+DC power is sent to the output (7).

Figure 8:
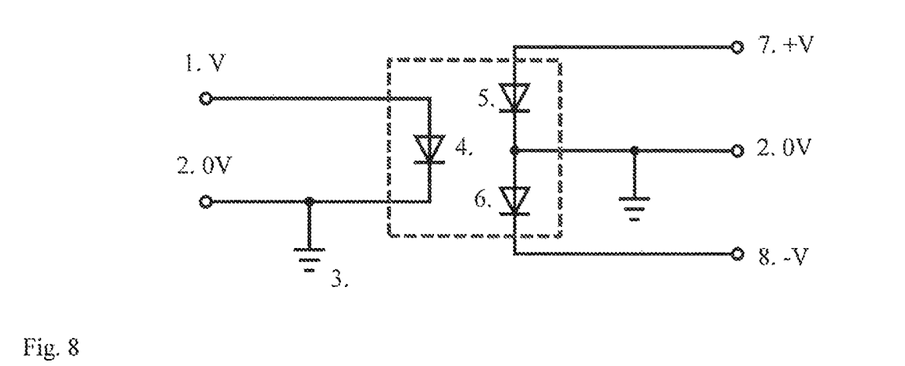
FIG. 8 is a circuit diagram of a DC-DC converter according to an example of the present disclosure.

An example in the form of a balun/split-rail DC-DC converter is shown in FIG. 8. A "balun" refers to BALanced-UNbalanced converter, which is used to convert a single voltage signal to a "balanced" or "push-pull" signal. This is useful for communications over longer distances and in noisy environments, such as conveying microphone signals for example. The coupled light-emitting diode version of this device may also function as a power supply DC-DC converter to produce a "split-rail" power supply, with both positive and negative voltages, from a single-rail supply.

An input voltage (1) referenced to 0V (2) and optionally earth (3) is fed to a primary LED (4). The primary (4) is coupled to two secondaries (5) and (6) with the area ratio 2:1:1, leading to equal voltages across each; the secondaries (5) and (6) are connected in series, with a common terminal similar to the "centre tap" of an induction transformer. This centre tap gives the output zero volts reference, optionally earthed, alongside a "push" signal or positive supply rail (7), and a "pull" signal or negative is supply rail (8) depending on whether the device is being used as a balun, or a DC-DC converter respectively.

The input voltage (1), referenced to 0 Volts (2) which may be earthed (3), is fed to a primary light-emitting diode (4). The primary is coupled to two secondaries (5) and (6) with an area ratio of 2:1:1. (5) and (6) are connected in series so that they share a common terminal, which would be called a "centre tap" in an induction transformer. This centre tap provides the 0V reference which again may be earthed, while (5) provides the positive output and (6) provides the negative output.

An advantage of this circuit is that the outputs (7) and (8) may be symmetrically loaded by power drawn from either output: If power is drawn from the negative rail, any depletion of the supply voltage affects both rails at the same time. This could be advantageous in circuits where asymmetric changes to the supply voltage would generate spurious and unwanted signals or distortion.

Figure 9:
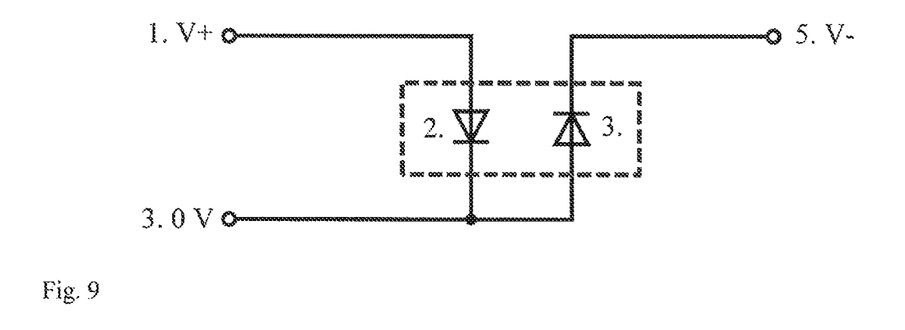
FIG. 9 is a circuit diagram of a non-isolated DC-DC converter according to an example of the present disclosure.

A non-isolated version of the DC-DC converter is shown in FIG. 9, where the primary (2) and secondary (3) LEDs are not electrically separate but share a common connection. The common connection defines the relative voltage between terminals (1) and (5). A common connection may also reduce the cost and complexity of manufacture of the assembly. The orientations of the primary and secondary LEDs relative to their common terminal may be varied as required. This circuit can be used to generate a negative voltage (5) from a positive supply voltage (1), or to generate a higher voltage from a low voltage power supply (either positive or negative).

A preferred approach to achieving very high optical coupling efficiency is to build the two light-emitting diodes inside the same semiconductor crystal.

Figure 10:
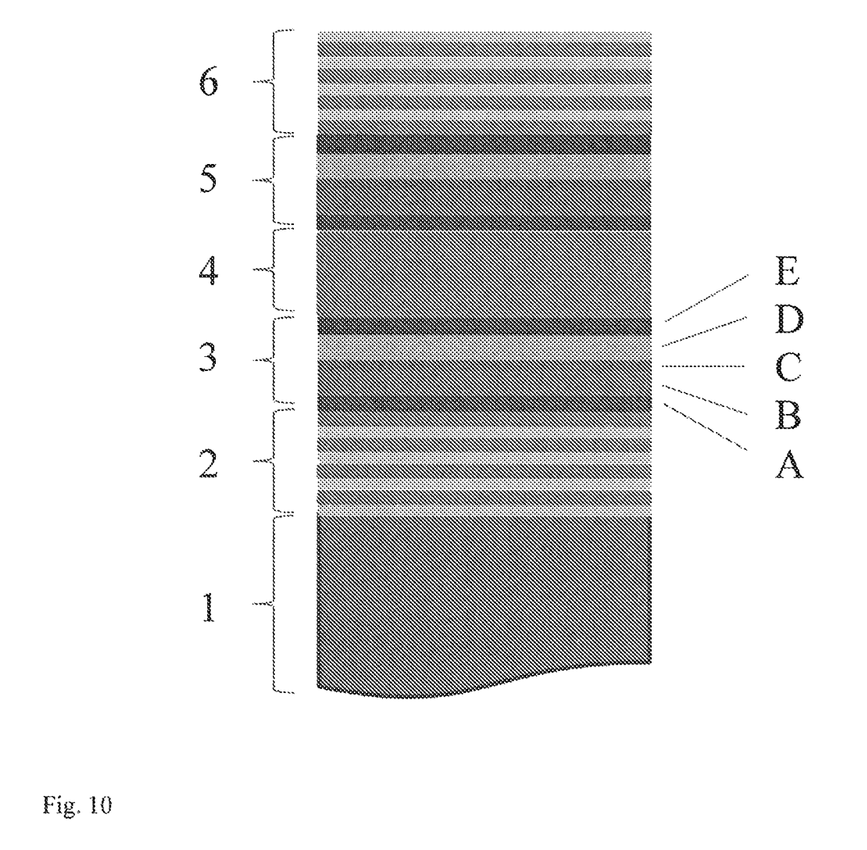
FIG. 10 is a cross-sectional side view through part of a semiconductor device according to an example of the present disclosure.

A single device of layered construction is shown in FIG. 10 and comprises the following layers:
1. A substrate
2. A lower mirror comprising alternating layers of material with different refractive indices (a Distributed Bragg Reflector, DBR)
3. The primary light emitting diode layers
4. A spacer layer for electronic isolation but good optical coupling
5. The secondary light emitting diode layers
6. An upper mirror comprising either DBR or metallic mirror.

The light emitting diode layers might comprise:
A. A p-type contact layer
B. A p-type confinement layer with higher bandgap than the active layers (C).
C. An active layer(s) that may comprise further semiconductor layers
D. An n-type confinement layer with higher bandgap than the active layers (C).
E. An n-type contact layer.

Figure 11:
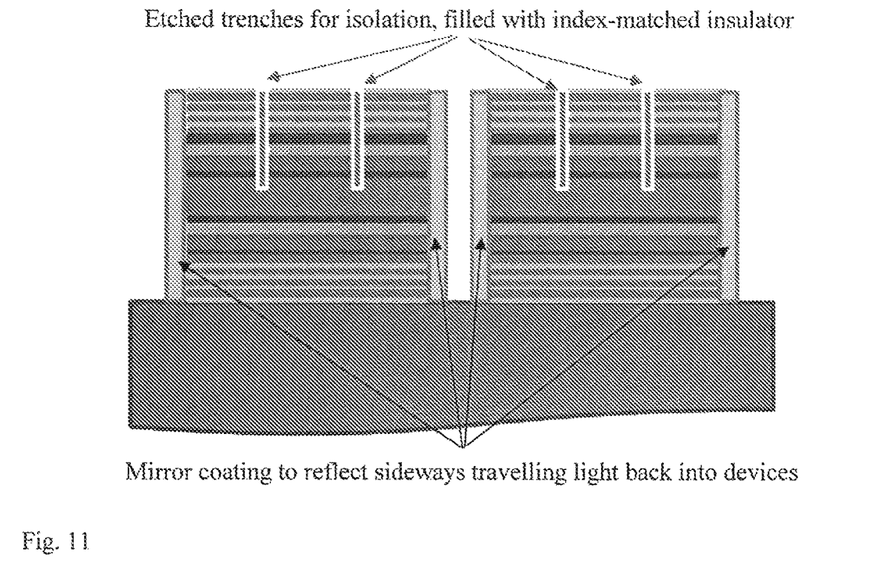
FIG. 11 is a cross-sectional side view through part of a further semiconductor device according to an example of the present disclosure.

The device may be processed into either a single cut piece of the overall structure or be etched to isolate the structure on a larger piece of the substrate. A mirror coating may be applied to the side layers to reflect escaping photons back into the device, as shown in FIG. 11.

The spectral properties (emission and absorption, as well as losses) of the active layer(s) (C) in both the primary (3) and secondary (5) diodes would be closely matched to each other.

The spacer layer (4) would be of a closely matched refractive index with low absorption of the light emitted by the diode layers. This refractive index matching could be achieved by a single material with suitable properties, or some structured combination of materials, such as a layered superlattice or suspension of nanostructured particles.

The thickness and material or structure choice for the spacer layer (4) would be varied to achieve greater electrical isolation, depending on the required safety level for a device's operation.

If the primary and secondary light emitting diode regions have the same total area, a transformer may then be created by subdividing the primary and/or secondary light emitting diodes. The subdivided regions can then be connected in series and/or parallel to create a ratio of primary:secondary area, equivalent to the ratio of turns in a magnetic induction transformer.

For instance, if the primary light emitting region is undivided whilst the secondary light emitting region is divided into 5 regions, and these secondary regions are connected in series, then the "transformer" has a ratio of 1:5. If there are no losses, this means the current in the secondary circuit is one fifth that of the primary region, whilst the voltage across the series combination of secondaries is 5 times that across the single primary. Key to this particular example is that the current (and photon) densities in the primary and secondary light emitting regions are equalised and uniform.

The bottom light-emitting diodes can be divided by etching through the layered structure, into or below the lower mirror (2) in the structure of FIG. 10, as shown in FIG. 11. This would be desirable to make a series circuit of primary or secondary cells to handle a higher voltage, or to introduce fault tolerance in case a diode short-circuits.

Subdivision of the top light-emitting diodes can be achieved by partially etching a trench through layers (4), (5), and (6) to isolate them electrically as shown at the top of FIG. 11. The trench may be filled to improve electrical isolation and heat dissipation, with a material that may also help to match refractive index and avoid optical losses. The divided regions will need separate electrical contacts for each region; these could be hard-wired to create a fixed area ratio or combined with a switch matrix to allow a variable area ratio "smart" transformer.

In the example implementation of primary/secondary cell subdivision in FIG. 11, a 1:3 ratio is present between the top and bottom light-emitting diode layers.

Figure 12:
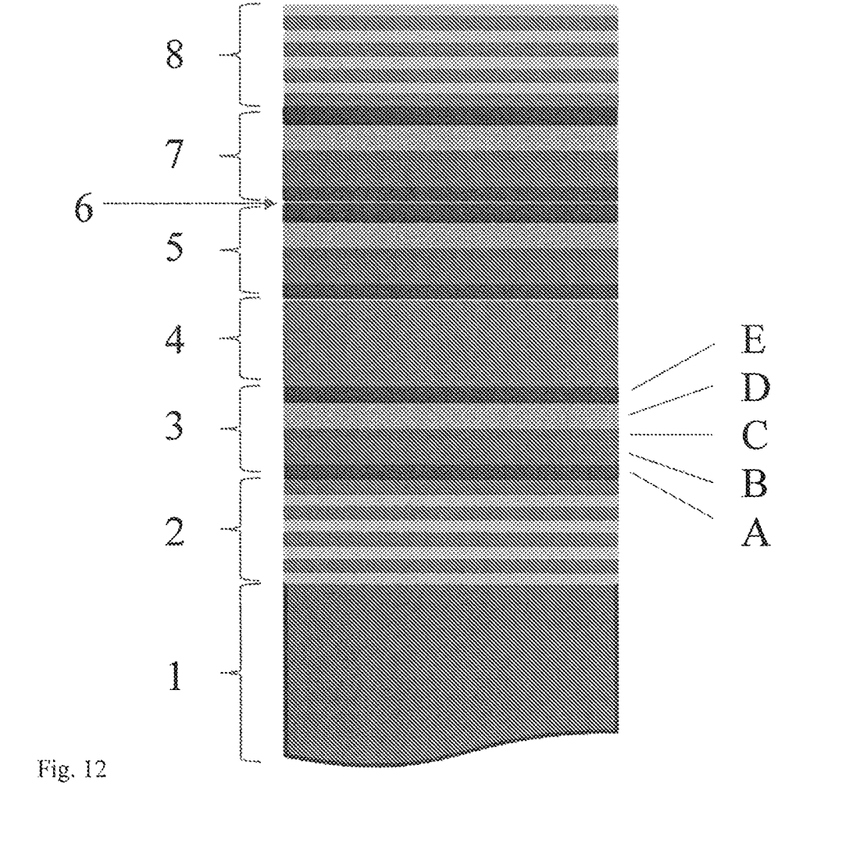
FIG. 12 is a cross-sectional side view through part of a semiconductor device according to an example of the present disclosure which includes two secondary LEDs.

A variation shown in FIG. 12 is to repeat layers (3), (4), and (5) to achieve the desired ratio of primary:secondary area. Tunnel junctions can then be used to connect these regions in series as required, only requiring external contacts at the top and bottom of the primary and secondary regions. This reduces the complexity of device processing with the trade-off of increasing the device growth time and complexity. An example layer structure with a 1:2 ratio as shown in FIG. 12 comprises:
1. A substrate
2. A lower mirror comprising alternating layers of material with different refractive indices (a Distributed Bragg Reflector, DBR)
3. The primary light emitting diode layers
4. A spacer layer for electronic isolation but good optical coupling
5. The first secondary light emitting diode layers
6. Tunnel junction
7. The second secondary light emitting diode layers
8. An upper mirror comprising either DBR or metallic mirror.

This variation (vertical integration) can be combined with the previous processing scheme (horizontal integration) to achieve higher area ratios.

Figure 13:
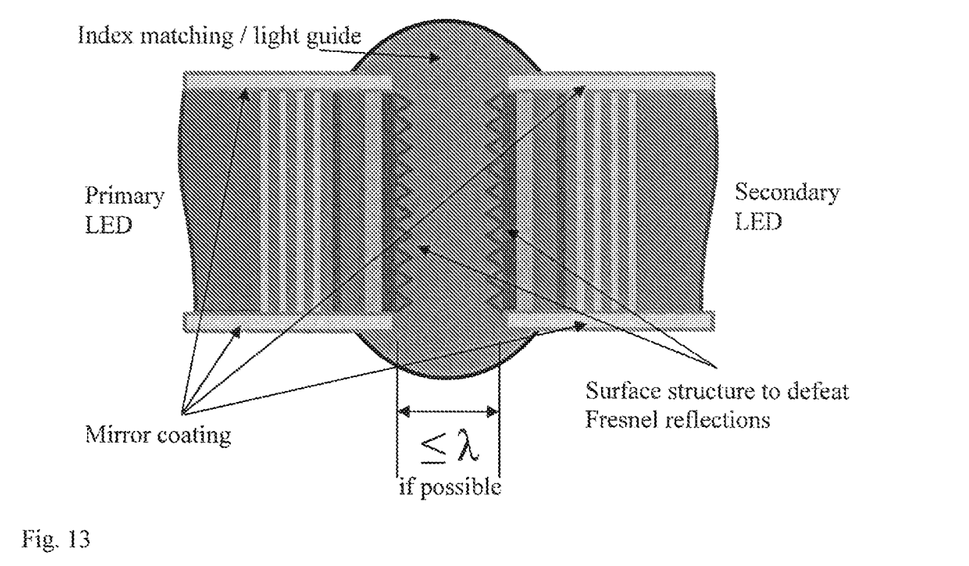
FIG. 13 is a cross-sectional side view through part of an assembly comprising two optically coupled devices according to an example of the present disclosure.

A conceptually simpler variation is to have separate, discrete primary and secondary light-emitting diode devices and to place them near enough to allow good optical coupling between them. An example is shown in FIG. 13. If very close, evanescent coupling between the devices may allow for high efficiency optical coupling.

The use of a high refractive index medium between the devices may enhance the optical coupling. For example, glycerol (refractive index of approximately 1.47) may double the efficiency of coupling between two gallium arsenide phosphide light-emitting diodes.

Material choices can potentially minimise the refractive index mismatch. For example, if GaN light-emitting diodes can be used (refractive index 2.5) with a diamond (2.4) or high-index glass (e.g. Ohara S-LAH79, refractive index 2) spacer, then losses could be minimised.

For larger separation between devices, the optical interfaces (for example, the top surface of a light-emitting diode) may need to be structured to overcome the Fresnel reflections from planar interfaces. As the distance is further increased, optical elements such as lenses or other guiding optics would be required to achieve high efficiencies, but these methods will not exceed the efficiency of simply placing the devices into optical contact.

The invention claimed is:

1. An opto-electronic assembly comprising:
   a first circuit comprising a primary light-emitting diode (LED); and
   a second circuit comprising a secondary LED,
   wherein the primary and secondary LEDs are optically coupled to each other so as to provide a first bidirectional current transfer ratio between the primary and secondary LEDs of at least 32%.

2. The assembly of claim 1, wherein the primary and secondary LEDs are optically coupled to each other so as to exhibit a load current reflection therebetween of at least 10%.

3. The assembly of claim 1, wherein the secondary LED is configured to achieve a population inversion at a lower current than the primary LED.

4. The assembly of claim 1, wherein:
   a primary reverse LED is electrically coupled in parallel with the primary LED, with a forward conduction direction of the primary reverse LED opposite to that of the primary LED,
   a secondary reverse LED is electrically coupled in parallel with the secondary LED, with a forward conduction direction of the secondary reverse LED opposite to that of the secondary LED, and
   the primary reverse LED and the secondary reverse LED are optically coupled to each other so as to provide a second bidirectional current transfer ratio between the primary and secondary reverse LEDs of at least 32%.

5. The assembly of claim 1, wherein:
   a primary reverse LED is electrically coupled in parallel with the primary LED, with a forward conduction direction of the primary reverse LED opposite to that of the primary LED,
   a first reverse protection diode is electrically coupled in series with the secondary LED, with a forward conduction direction of the first reverse protection diode opposite to that of the secondary LED,
   a secondary parallel LED is electrically coupled in series with a second reverse protection diode, with a forward conduction direction of the second reverse protection diode opposite to that of the secondary parallel LED, and a forward conduction direction of the secondary parallel LED in the same direction as that of the secondary LED, and
   the primary reverse LED and the secondary parallel LED are optically coupled to each other so as to provide a second bidirectional current transfer ratio between the primary reverse and secondary parallel LEDs of at least 32%.

6. The assembly of claim 1, wherein:
   a first primary reverse protection diode is electrically coupled in series with the primary LED, with a forward conduction direction of the first primary reverse protection diode in the same direction as that as of the secondary LED,
   a second primary LED is electrically coupled in series with a second primary reverse protection diode, with a forward conduction direction of the second primary LED in the same direction as that as of the second primary reverse protection diode,
   the primary LED and the first primary reverse protection diode are electrically coupled in parallel with the second primary LED and the second primary reverse protection diode, with the forward conduction direction of the second primary LED in the opposite direction to that of the primary LED, and
   the primary LED and the second primary LED are each optically coupled to the secondary LED so as to provide a respective bidirectional current transfer ratio between (a) the primary LED and the secondary LED, and (b) the second primary LED and the secondary LED, of at least 32%.

7. The assembly of claim 1, wherein:
   the first circuit has a primary set of LEDs which comprises the primary LED and at least one further primary LED,
   the second circuit has a secondary set of LEDs which comprises the secondary LED and at least one further secondary LED,
   each LED of the primary set is optically coupled to a respective LED of the secondary set so as to provide a second bidirectional current transfer ratio between each LED of the primary set and the respective LED of the secondary set of at least 32%, and
   the LEDs of the primary set are electrically coupled in parallel and the LEDs of the secondary set are electrically coupled in series.

8. The assembly of claim 1, including:
   a third circuit comprising a biasing LED for connection to a DC bias input power supply, wherein the third circuit is electrically separate from the first and second circuits,
   wherein the biasing LED is optically coupled to each of the primary and secondary LEDs so as to provide a respective unidirectional current transfer ratio between the biasing LED and each of the primary and secondary LEDs of at least 32%.

9. The assembly of claim 1, wherein:
   the primary LED is electrically coupled to the secondary LED, and
   orientations of the primary and secondary LEDs are either the same (an anode of one respective LED coupled to a cathode of the other respective LED) or opposite (that is, anodes coupled or cathodes coupled).

10. The assembly of claim 1, including:
    a second secondary LED which is electrically coupled in series with the secondary LED, with a forward conduction direction of the second secondary LED in the same direction as that as of the secondary LED,
    wherein the primary LED is optically coupled to each of the secondary LED and the second secondary LED so as to provide a respective bidirectional current transfer ratio between the primary LED and each of the secondary LED and the second secondary LED of at least 32%.

11. The assembly of claim 1, wherein the primary and secondary LEDs are provided on a common semiconductor substrate.

12. The assembly of claim 11, wherein the primary and secondary LEDs are provided in a common stack of layers of material on the common semiconductor substrate.

13. The assembly of claim 12, including a light reflective coating on at least one side surface of the common stack of layers.

14. The assembly of claim 13, wherein upper layers of the common stack of layers are divided by trenches to form a plurality of LEDs.

15. The assembly of claim 14, wherein the trenches are filled with an insulating material.

16. The assembly of claim 15, wherein an additional LED is provided above the primary and secondary LEDs in the common stack of layers.

17. The assembly of claim 1 including an optical coupling between the primary and secondary LEDs, wherein the optical coupling comprises at least one of glycerol, silicone epoxy, PMMA (acrylic), sapphire, silicon crystal, silicon carbide, silicon nitride, titanium dioxide, magnesium oxide, tantalum oxide, hafnium dioxide, hafnium nitride, zirconia, zirconium nitride, zinc oxide, zinc selenide, quartz, diamond and glass.

18. The assembly of claim 1, wherein two optically coupled LEDs are configured to emit and absorb more s-polarised light than p-polarised light or vice versa.

19. The assembly of claim 18, wherein a material that is absorbing and emitting light in one or more of the primary and secondary LEDs is under a strain of greater than or equal to plus or minus 0.25% when compared to the material in a fully relaxed state.

20. The assembly of claim 19, wherein the material that is absorbing and emitting light in one or more of the primary and secondary LEDs is modified by lithography or self-assembly in a manner that enhances or suppresses the respective LED's emission or absorption of the p-polarised light relative to the s-polarised light by plus or minus 25%.

21. The assembly of claim 1 including a dielectric mirror having a periodically-modulated refractive index profile that, at a normal incidence relative to an axis of modulation, is able to reflect light of a frequency between a frequency of a light emission of the primary and secondary LEDs and a frequency of twice the frequency of the light emission of the primary and secondary LEDs.

22. A method, wherein a first circuit comprises a primary LED, a second circuit comprises a secondary LED, and the primary and secondary LEDs are optically coupled to each other so as to provide a bidirectional current transfer ratio between the primary and secondary LEDs of at least 32%, the method comprising the steps of:
  passing a current through the primary LED via the first circuit; and
  drawing a current in the second circuit via the secondary LED.

23. The method of claim 22, wherein the primary and secondary LEDs are optically coupled to each other so as to exhibit a load current reflection therebetween of at least 10%.

24. The method of claim 22, wherein a magnetic field is generated so as to enhance or suppress one or more of the primary and secondary LED's emission or absorption of p-polarised light relative to s-polarised light by plus or minus 25%.

* * * * *